(12) United States Patent
Zhang

(10) Patent No.: US 10,446,097 B2
(45) Date of Patent: Oct. 15, 2019

(54) METHOD FOR DETECTING GRAYSCALE COMPENSATION DATA OF LCD PANEL

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Hua Zhang, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/744,810

(22) PCT Filed: Dec. 14, 2017

(86) PCT No.: PCT/CN2017/116280
§ 371 (c)(1),
(2) Date: Jan. 14, 2018

(87) PCT Pub. No.: WO2019/095481
PCT Pub. Date: May 23, 2019

(65) Prior Publication Data
US 2019/0156769 A1    May 23, 2019

(30) Foreign Application Priority Data
Nov. 17, 2017 (CN) .......................... 2017 1 1148907

(51) Int. Cl.
G09G 3/36 (2006.01)
H04N 5/372 (2011.01)
G02F 1/1335 (2006.01)

(52) U.S. Cl.
CPC ...... *G09G 3/3607* (2013.01); *G02F 1/133611* (2013.01); *H04N 5/372* (2013.01); *G09G 2310/08* (2013.01)

(58) Field of Classification Search
CPC ...... G09G 3/36; G09G 3/3607; G09G 3/3622; G09G 3/3625; G09G 3/364; G09G 3/3648; G09G 2320/0233; G09G 2320/0242
(Continued)

(56) References Cited

U.S. PATENT DOCUMENTS 6,608,614 B1 * 8/2003 Johnson ............... G02B 6/0043
345/102
9,805,674 B2 * 10/2017 Syu ........................ G09G 3/36
(Continued)

*Primary Examiner* — Amit Chatly
*Assistant Examiner* — Nelson Lam
(74) *Attorney, Agent, or Firm* — Hemisphere Law, PLLC; Zhigang Ma

(57) ABSTRACT

A method for detecting grayscale compensation data of a LCD panel is provided. The method includes obtaining a first grayscale compensation data according tothephotographed screen of the LCD panel in the brightest state. According to a second grayscale value to be photographed, a predetermined grayscale compensation data scaling algorithm, and the first grayscale compensation data, a second grayscale compensation data corresponding to the second grayscale value is calculated and used to compensate a second grayscale data. The display screen of the LCD panel driving by the compensated second grayscale data is then photographed to obtain a third grayscale compensation data. The third grayscale compensation data is the grayscale compensation data of the LCD panel itself corresponding to the second grayscale value. The influence of the brightness difference of the test backlight module is eliminated. The grayscale compensation data of the LCD panel itself is accurately obtained.

14 Claims, 5 Drawing Sheets

(58) Field of Classification Search
USPC .................................................. 345/87–104
See application file for complete search history.

(56) References Cited

U.S. PATENT DOCUMENTS

| | | | | |
|---|---|---|---|---|
| 10,223,979 | B2* | 3/2019 | Zhang | G09G 3/3406 |
| 10,319,315 | B2* | 6/2019 | Zhang | G09G 3/3607 |
| 2007/0229426 | A1* | 10/2007 | You | G09G 3/3648 |
| | | | | 345/89 |
| 2008/0106508 | A1* | 5/2008 | Lee | G09G 3/3611 |
| | | | | 345/89 |
| 2010/0141559 | A1* | 6/2010 | Hwang | G09G 5/003 |
| | | | | 345/58 |
| 2010/0149205 | A1* | 6/2010 | Robinson | G01J 1/04 |
| | | | | 345/589 |
| 2012/0206504 | A1* | 8/2012 | Ha | G09G 5/10 |
| | | | | 345/690 |
| 2013/0120659 | A1* | 5/2013 | Park | G06T 5/001 |
| | | | | 348/674 |
| 2014/0198202 | A1* | 7/2014 | Kim | G02F 1/1309 |
| | | | | 348/125 |
| 2015/0187289 | A1* | 7/2015 | Kim | G01M 11/064 |
| | | | | 345/89 |
| 2015/0287350 | A1* | 10/2015 | Jun | G09G 3/006 |
| | | | | 345/690 |
| 2015/0356896 | A1* | 12/2015 | Kao | G09G 3/006 |
| | | | | 345/589 |
| 2016/0180765 | A1* | 6/2016 | Hwang | G09G 3/20 |
| | | | | 345/690 |
| 2018/0190214 | A1* | 7/2018 | Kim | G09G 3/20 |

* cited by examiner

METHOD FOR DETECTING GRAYSCALE COMPENSATION DATA OF LCD PANEL

RELATED APPLICATIONS

The present application is a National Phase of International Application Number PCT/CN2017/116280, filed on Dec. 14, 2017, and claims the priority of China Application 201711148907.2, filed on Nov. 17, 2017, the entirety of which is incorporated by reference herein.

FIELD OF THE DISCLOSURE

The disclosure relates to a display technical field, and more particularly to a method for detecting grayscale compensation data of a liquid crystal display (LCD) panel,

BACKGROUND

With the development of display technology, liquid crystal display (LCD) and other planar display devices have advantages including high quality, power saving, thin body, wide application and etc. Accordingly, they are widely used in mobile phones, televisions, personal digital assistants, digital cameras, notebook computers, desktop computers and other consumer electronics products, and become the mainstream display devices.

Most of the current liquid crystal display devices are backlight-type liquid crystal display devices. The backlight-type liquid crystal display devices comprise a housing, a liquid crystal panel disposed in the housing, and a backlight module disposed in the housing. In general, a liquid crystal panel is composed of a color filter (CF) substrate, a thin film transistor array substrate (TFT Array Substrate), and a liquid crystal layer sandwiched between the CF substrate and the TFT substrate. The working principle of the liquid crystal panel is applying driving voltage to control rotation of liquid crystal molecules of the liquid crystal layer, for controlling the output of light and for refracting light from the backlight module to generate images. The assembling process of a liquid crystal display panel generally comprises array substrate (Array) processes (thin film, photolithography, etching and stripping processes), CF substrate processes, and cell processes (attaching the TFT substrate and the CF substrate).

After the liquid crystal display panel is manufactured, due to the limitation of fabrication processes, each liquid crystal display panel would have different degrees of brightness non-uniformity (grayscale mura) phenomenon. In the prior art, to compensate the grayscale mura of the liquid crystal display panel, a liquid crystal display panel photographed by a camera displays a screen in different grayscale. A grayscale compensation data is obtained according to the brightness difference of the display screen. The grayscale compensation data is stored in a flash memory. After a timing controller (Tcon IC) is turned on, a grayscale data to be displayed is compensated with the grayscale compensation data first, and then the compensated grayscale data is output for displaying a screen. As a result, the brightness uniformity of the liquid crystal display panel is improved.

However, in the prior art, when the grayscale compensation data is obtained, it is necessary to pair the liquid crystal display panel with the test backlight module on the test machine. The light source is provided to the liquid crystal display panel through the test backlight module so as to display images. The grayscale compensation data is then obtained through photographing the display screen of the liquid crystal display panel by the camera. If there is a significant brightness difference in the test backlight module itself due to the influence of longtime use and other reasons, the brightness difference in the screen photographed by the camera may not come from the liquid crystal display panel but come from the test backlight module. The grayscale compensation data obtained from this screen is not for the liquid crystal display panel itself, either, but for the common grayscale compensation data of both the liquid crystal display panel and the test backlight module. After the liquid crystal display panel is paired with the production backlight module without obvious brightness difference, the brightness difference of the liquid crystal display panel is still compensated with this grayscale compensation data. As a result, due to the wrong grayscale compensation data, new brightness difference would be induced.

SUMMARY

The objective of the disclosure is to provide a method for detecting grayscale compensation data of a liquid crystal display panel. Therefore, the influence of the brightness difference of the test backlight module can be eliminated. The grayscale compensation data of the liquid crystal display panel itself is accurately obtained.

In order to achieve the above objective, the disclosure provides a method for detecting grayscale compensation data of a liquid crystal display panel, comprising the following steps:

Step S1: Pairing and assembling the liquid crystal display panel and a test backlight module to provide light for the liquid crystal display panel through the test backlight module.

Step S2: Inputting a first grayscale data corresponding to a first grayscale value to the liquid crystal display panel so that the liquid crystal display panel is in the brightest state, photographing a screen of the liquid crystal display panel by a camera, and calculating a first grayscale compensation data according to the brightness difference of the screen.

Step S3: Determining a second grayscale value to be photographed, and calculating a second grayscale compensation data corresponding to the second grayscale value to be photographed according to the second grayscale value to be photographed, a predetermined grayscale compensation data scaling algorithm, and the first grayscale compensation data.

Step S4: Compensating a second grayscale data corresponding to the second grayscale value with the second grayscale compensation data to obtain a compensated second grayscale data.

Step 5: Inputting the compensated second grayscale data to the liquid crystal display panel, photographing the screen of the liquid crystal display panel by the camera, and obtaining a third grayscale compensation data of the liquid crystal display panel under the second grayscale value according to the brightness difference of the screen.

The predetermined grayscale compensation data scaling algorithm is:

$$b = \frac{N}{M}a,$$

wherein b is the second grayscale compensation data, a is the first grayscale compensation data, N is the second grayscale value, and M is the first grayscale value.

The method for detecting grayscale compensation data of a liquid crystal display panel further comprises:

Step S6: Pairing and assembling the liquid crystal display panel with a production backlight module to provide light for the liquid crystal display panel through the production backlight module.

Step S7: Performing brightness compensation on the second grayscale value through the third grayscale compensation data when the liquid crystal display panel displays the second grayscale value.

The step S7 specifically comprises:

obtaining the third grayscale compensation data and the second grayscale data;

compensating the second grayscale data with the third grayscale compensation data to obtain a target grayscale data;

driving the liquid crystal display panel through the target grayscale data to display the screen.

The step S5 further comprises: storing the third grayscale compensation data in a flash memory chip.

The flash memory chip is electrically connected to a compensation chip.

The compensation chip obtains the third grayscale compensation data from the flash memory chip and receives the second grayscale data to compensate the second grayscale data with the third grayscale compensation data so that the target grayscale data is obtained. The target grayscale data is output to a timing controller.

The first grayscale value is 255.

The brightness ratio of the darkest part to the brightest part of the production backlight module is greater than 95%.

The way for obtaining the third grayscale compensation data in the step S5 specifically comprises:

according to the screen photographed by the camera, obtaining the brightness of each of pixels in the screen;

calculating the brightness difference between each of the pixels in the screen and a pixel at the center of the screen;

according to a gamma curve, calculating a grayscale data required for compensating the brightness difference to obtain the third grayscale compensation data.

The camera is a Charge-coupled Device (CCD) camera.

The disclosure further provides a method for detecting grayscale compensation data of a liquid crystal display panel, comprising the following steps:

Step S1: Pairing and assembling the liquid crystal display panel and a test backlight module to provide light for the liquid crystal display panel through the test backlight module.

Step S2: Inputting a first grayscale data corresponding to a first grayscale value to the liquid crystal display panel so that the liquid crystal display panel is in the brightest state, photographing a screen of the liquid crystal display panel by a camera, and calculating a first grayscale compensation data according to the brightness difference of the screen.

Step S3: Determining a second grayscale value to be photographed, and calculating a second grayscale compensation data corresponding to the second grayscale value to be photographed according to the second grayscale value to be photographed, a predetermined grayscale compensation data scaling algorithm, and the first grayscale compensation data.

Step S4: Compensating a second grayscale data corresponding to the second grayscale value with the second grayscale compensation data to obtain a compensated second grayscale data.

Step S5: Inputting the compensated second grayscale data to the liquid crystal display panel, photographing the screen of the liquid crystal display panel by the camera, and obtaining a third grayscale compensation data of the liquid crystal display panel under the second grayscale value according to the brightness difference of the screen.

Step S6: Pairing and assembling the liquid crystal display panel with a production backlight module to provide light for the liquid crystal display panel through the production backlight module.

Step S7: Performing brightness compensation on the second grayscale value through the third grayscale compensation data when the liquid crystal display panel displays the second grayscale value.

Wherein the predetermined grayscale compensation data scaling algorithm is:

$$b = \frac{N}{M}a,$$

wherein b is the second grayscale compensation data, a is the first grayscale compensation data, N is the second grayscale value, and M is the first grayscale value.

Wherein the step S7 specifically comprises:

obtaining the third grayscale compensation data and the second grayscale data;

compensating the second grayscale data with the third grayscale compensation data to obtain a target grayscale data; and driving the liquid crystal display panel through the target grayscale data to display the screen.

Wherein the step S5 further comprises: storing the third grayscale compensation data in a flash memory chip.

Wherein the flash memory chip is electrically connected to a compensation chip,

Wherein the compensation chip obtains the third grayscale compensation data from the flash memory chip and receives the second grayscale data to compensate the second grayscale data with the third grayscale compensation data so that the target grayscale data is obtained. The target grayscale data is output to a timing controller.

The beneficial effects of the disclosure are as follows:

The disclosure provides a method for detecting grayscale compensation data of a liquid crystal display panel. The method includes first photographing the screen of the liquid crystal display panel in the brightest state. A first grayscale compensation data is obtained according to the screen. Afterwards, according to a second grayscale value to be photographed, a predetermined grayscale compensation data scaling algorithm, and the first grayscale compensation data, a second grayscale compensation data corresponding to the second grayscale value to be photographed is calculated. A second grayscale data is compensated with the second grayscale compensation data. The display screen of the liquid crystal display panel driving by the compensated second grayscale data is then photographed to obtain a third grayscale compensation data of the liquid crystal display panel corresponding to the second grayscale value. The third grayscale compensation data is the grayscale compensation data of the liquid crystal display panel itself corresponding to the second grayscale value. The influence of the brightness difference of the test backlight module can be eliminated. The grayscale compensation data of the liquid crystal display panel itself is accurately obtained.

BRIEF DESCRIPTION OF THE DRAWINGS

In order to further understand the features and technical contents of the disclosure, the detailed descriptions and the accompanying drawings of the disclosure are provided as follows. However, the drawings are only for reference and illustration, and are not intended to limit the disclosure.

In the drawings.

DETAILED DESCRIPTION OF PREFERRED EMBODIMENTS

In order to further illustrate the technical means and their effects of the disclosure, the preferred embodiments of the disclosure will be described in detail with reference to accompanying drawings as follows.

Figure 1:
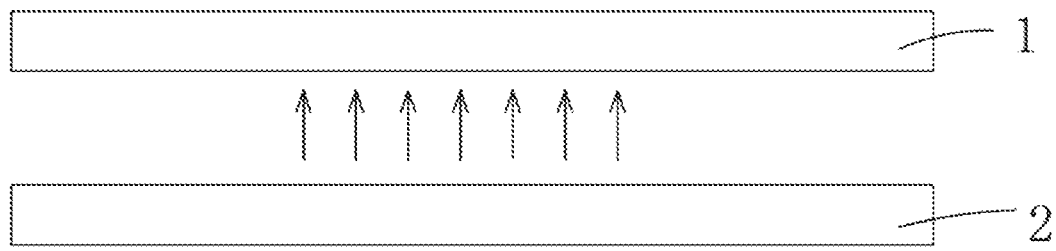
FIG. 1 is a schematic view of a step S1 of a method for detecting grayscale compensation data of a liquid crystal display panel according to the disclosure.
Figure 6:
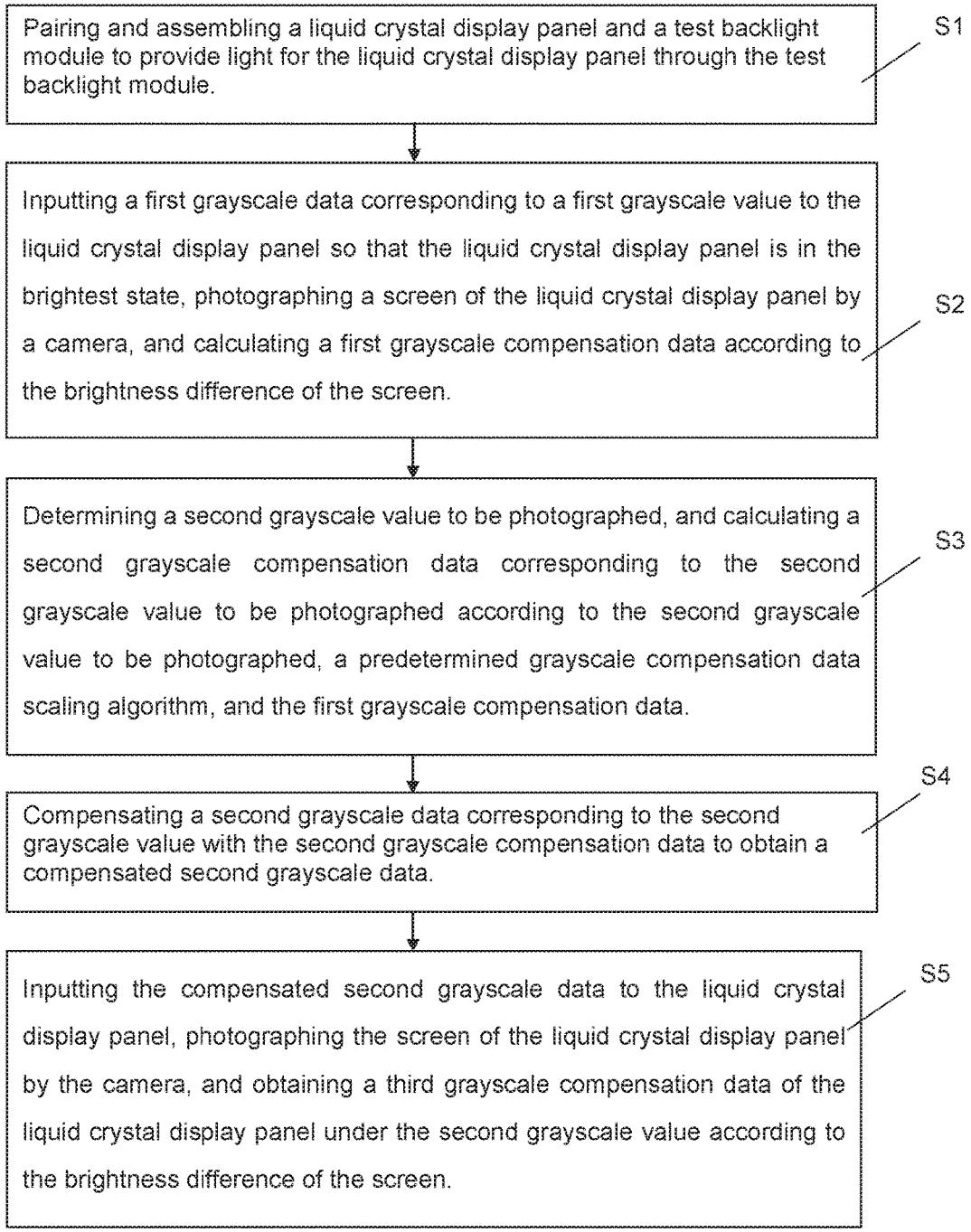
FIG. 6 is a flowchart of a method for detecting grayscale compensation data of a liquid crystal display panel according to the disclosure.

Referring to FIG. 6, the disclosure provides a method for detecting grayscale compensation data of a liquid crystal display panel, comprising the following steps:

Step S1: referring to FIG. 1, a liquid crystal display panel 1 is paired and assembled with a test backlight module 2. The light source is provided to the liquid crystal display panel 1 through the test backlight module 2.

Specifically, the brightness uniformity of the test backlight module 2 when used for the first time is usually greater than 95%. Namely, the brightness ratio of the darkest part to the brightest part is greater than 95%. However, the brightness uniformity may be reduced after used for a long time. It results in the brightness (bright/dark) difference. The accuracy of the grayscale compensation data of the liquid crystal display panel is affected.

Figure 2:
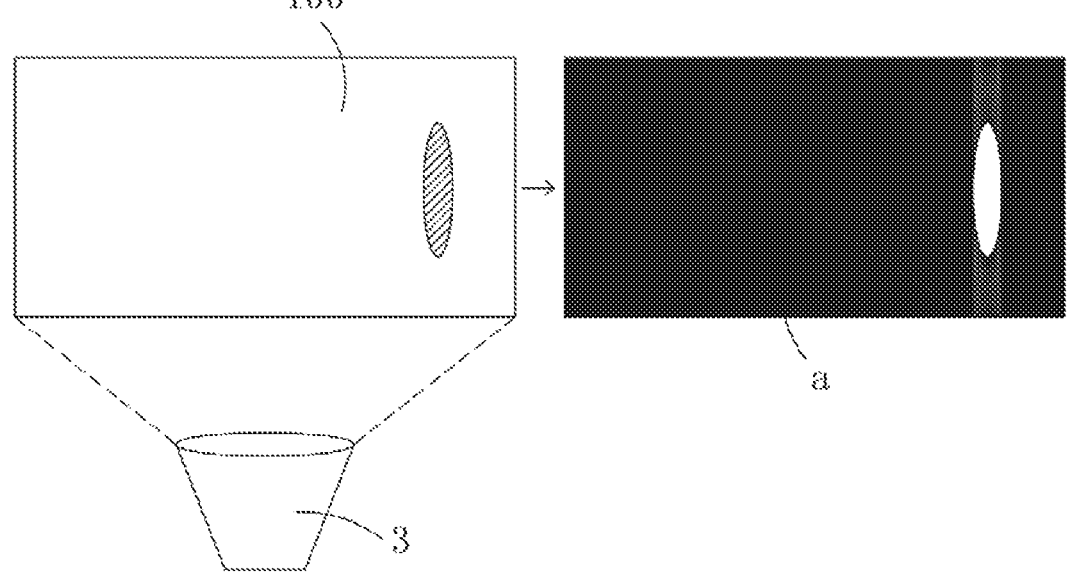
FIG. 2 is a schematic view of a step S2 of a method for detecting grayscale compensation data of a liquid crystal display panel according to the disclosure.

Step S2: referring to FIG. 2, a first grayscale data corresponding to a first grayscale value is input to the liquid crystal display panel 1 so that the liquid crystal display panel 1 is in the brightest state. A screen of the liquid crystal display panel 1 is photographed by a camera 3. A first grayscale compensation data is calculated according to the brightness difference of the screen.

Specifically, as shown in FIG. 2, the reference number 100 in the figure represents a screen corresponding to the first grayscale value when the liquid crystal display panel 1 is paired with the test backlight module 2. The reference number a represents the first grayscale compensation data.

Preferably, the first grayscale value is generally 255. At this case, the liquid crystal display panel 1 is in the brightest state. The brightness difference of the liquid crystal display panel 1 itself is very small and negligible. The first grayscale compensation data is a grayscale compensation data corresponding to the brightness difference of the test backlight module 2.

Preferably, the camera 3 is a Charge-coupled Device (CCD) camera.

Figure 3:
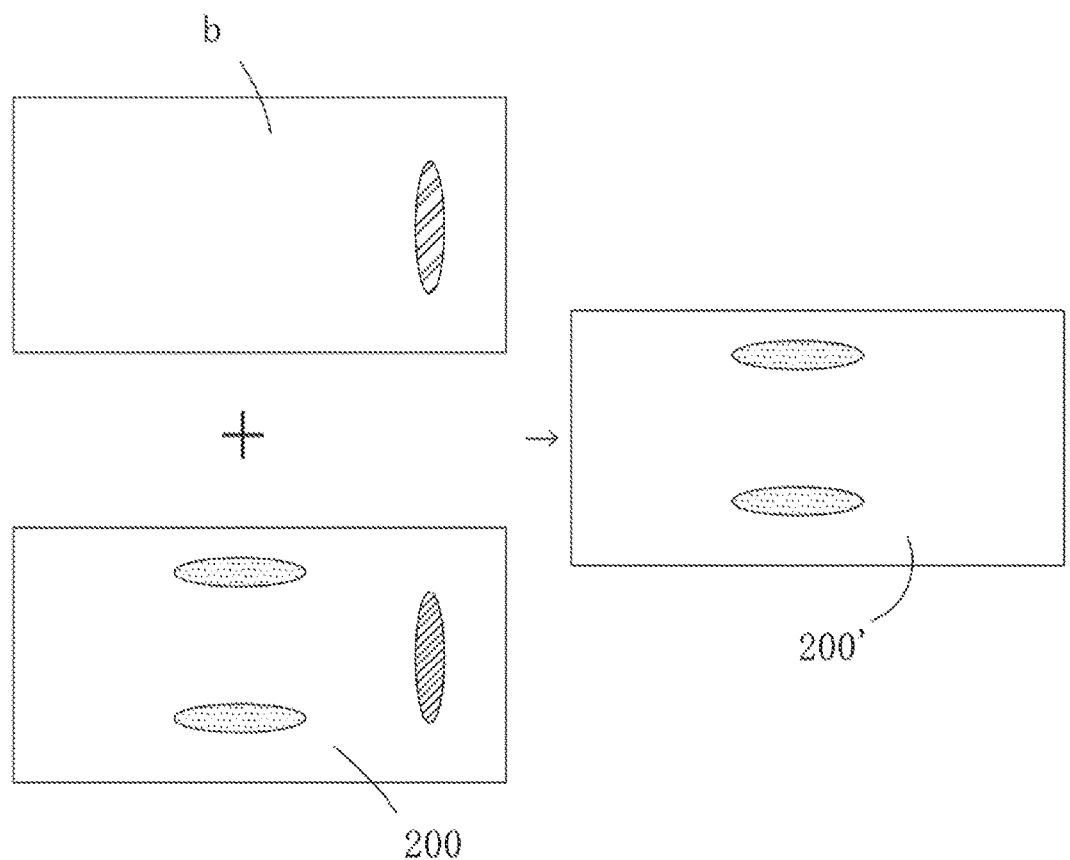
FIG. 3 is a schematic view of steps S3 and S4 of a method for detecting grayscale compensation data of a liquid crystal display panel according to the disclosure.

Step S3: referring to FIG. 3, a second grayscale value to be photographed is determined, and a second grayscale compensation data corresponding to the second grayscale value to be photographed is calculated according to the second grayscale value to be photographed, a predetermined grayscale compensation data scaling algorithm, and the first grayscale compensation data.

Preferably, as shown in FIG. 3, the reference number 200 in the figure represents a screen corresponding to the second grayscale value when the liquid crystal display panel 1 is paired with the test backlight module 2. The reference number 200' represents a screen corresponding to the compensated second grayscale value when the liquid crystal display panel 1 is paired with the test backlight module 2. The reference number b represents the second grayscale compensation data.

Furthermore, the predetermined grayscale compensation data scaling algorithm is:

$$b = \frac{N}{M}a,$$

wherein b is the second grayscale compensation data, a is the first grayscale compensation data, N is the second grayscale value, and M is the first grayscale value.

Specifically, for example, when the first grayscale compensation data is a and the second grayscale value to be photographed is 25, the second grayscale compensation data b is calculated to be approximately equal to a/10. As a result, the brightness difference of the test backlight module at the second grayscale value can be compensated with the second grayscale compensation data b.

Step S4: referring to FIG. 3, a second grayscale data corresponding to the second grayscale value is compensated with the second grayscale compensation data to obtain a compensated second grayscale data.

Specifically, following the above example, at this case, the compensated second grayscale data is a grayscale data that is compensated with the grayscale data corresponding to the grayscale value of 25, which corresponds to the second grayscale compensation data of a/10. The brightness difference of the test backlight module 2 can be eliminated by the compensation. As a result, the brightness difference appearing in the subsequent display screen all comes from the liquid crystal display panel 1 itself.

Figure 4:
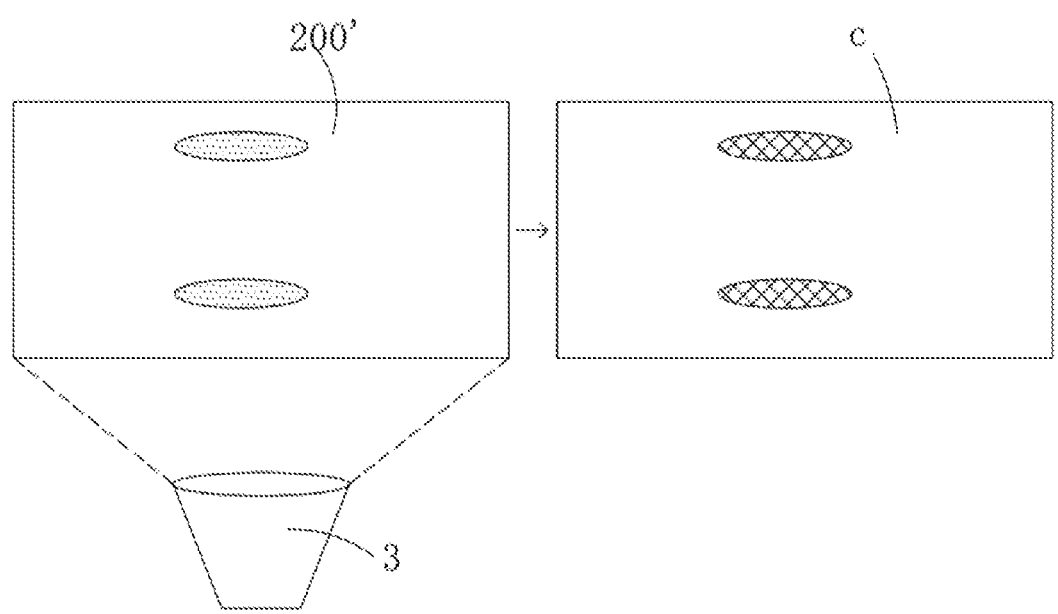
FIG. 4 is a schematic view of a step S5 of a method for detecting grayscale compensation data of a liquid crystal display panel according to the disclosure.

Step S5: referring to FIG. 4, the compensated second grayscale data is input to the liquid crystal display panel 1. The screen of the liquid crystal display panel 1 is photographed by the camera 3. According to the brightness difference of the screen, a third grayscale compensation data of the liquid crystal display panel 1 under the second grayscale value is obtained.

As shown in FIG. 4, the reference number c represents the third grayscale compensation data.

Specifically, the third grayscale compensation data is a grayscale compensation data for the brightness difference of the liquid crystal display panel 1 itself under the second grayscale value. The influence of the brightness difference of the test backlight module is excluded.

Specifically, the step S5 further comprises: storing the third grayscale compensation data c in a flash memory chip. The flash memory chip is electrically connected to a compensation chip. The compensation chip obtains the third grayscale compensation data from the flash memory chip and receives the second grayscale data to compensate the second grayscale data with the third grayscale compensation data. As a result, the target grayscale data is obtained. The target grayscale data is output to a timing controller.

Specifically, the way for obtaining the grayscale compensation data according to the screen photographed by the camera 3 in the disclosure comprises: according to the screen photographed by the camera 3, obtaining the brightness of each pixel in the screen. The brightness difference between each pixel in the screen and a pixel at the center of the screen is calculated. According to a gamma curve, a grayscale data required for compensating the brightness difference is calculated. The grayscale data required for compensating the brightness difference is the grayscale compensation data.

Figure 5:
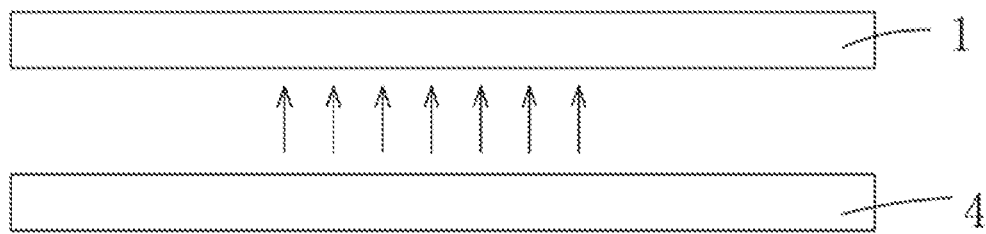
FIG. 5 a schematic view of a step S6 of a method for detecting grayscale compensation data of a liquid crystal display panel according to the disclosure.

Step S6: referring to FIG. 5, the liquid crystal display panel 1 is paired and assembled with a production backlight module 4. The light source is provided to the liquid crystal display panel 1 through the production backlight module 4.

Preferably, the brightness uniformity of the production backlight module 4 is greater than 95%. Namely, the brightness ratio of the darkest part to the brightest part is greater than 95%. There is no obvious brightness difference.

Step S7: brightness compensation is performed on the second grayscale value through the third grayscale compensation data when the liquid crystal display panel 1 displays the second grayscale value.

Specifically, the step S7 comprises: acquiring the third grayscale compensation data and the second grayscale data corresponding to the second grayscale value. The second grayscale data is compensated with the third grayscale compensation data to obtain the target grayscale data. The target grayscale data is used to drive the liquid crystal display panel 1 to display a screen.

Specifically, at this time, the light source is provided to the liquid crystal display panel 1 through the production backlight module 4. The brightness compensation is performed through the third grayscale compensation data. The brightness uniformity of the display screen of the liquid crystal display panel 1 is effectively enhanced. No brightness difference is newly induced.

Specifically, the first grayscale data, the second grayscale data, the first grayscale compensation data, the second grayscale compensation data, and the third grayscale compensation data described in the disclosure are all data matrices. The data matrices include multiple data values. Each data value corresponds to one pixel of the liquid crystal display panel 1.

In summary, the disclosure provides a method for detecting grayscale compensation data of a liquid crystal display panel. The method includes first photographing the screen of the liquid crystal display panel in the brightest state. A first grayscale compensation data is obtained according to the screen. Afterwards, according to a second grayscale value to be photographed, a predetermined grayscale compensation data scaling algorithm, and the first grayscale compensation data, a second grayscale compensation data corresponding to the second grayscale value to be photographed is calculated. A second grayscale data is compensated with the second grayscale compensation data. The display screen of the liquid crystal display panel driving by the compensated second grayscale data is then photographed to obtain a third grayscale compensation data of the liquid crystal display panel corresponding to the second grayscale value. The third grayscale compensation data is the grayscale compensation data of the liquid crystal display panel itself corresponding to the second grayscale value. The influence of the brightness difference of the test backlight module can be eliminated. The grayscale compensation data of the liquid crystal display panel itself is accurately obtained.

In the foregoing, other corresponding modifications and variations may be made by those skilled in the art according to the technical solutions and technical ideas of the disclosure. All such modifications and variations should be included in the protection scope of the disclosure.

What is claimed is:
1. A method for detecting grayscale compensation data of a liquid crystal display panel, comprising:
   a step S1, comprising pairing and assembling the liquid crystal display panel and a test backlight module to provide light for the liquid crystal display panel through the test backlight module;
   a step S2, comprising inputting a first grayscale data corresponding to a first grayscale value to the liquid crystal display panel so that the liquid crystal display panel is in a brightest state, photographing a screen of the liquid crystal display panel by a camera, and calculating a first grayscale compensation data according to a brightness difference of the screen;
   a step S3, comprising determining a second grayscale value to be photographed, and calculating a second grayscale compensation data corresponding to the second grayscale value to be photographed according to the second grayscale value to be photographed, a predetermined grayscale compensation data scaling algorithm, and the first grayscale compensation data;
   a step S4, comprising compensating a second grayscale data corresponding to the second grayscale value with the second grayscale compensation data to obtain a compensated second grayscale data; and
   a step S5, comprising inputting the compensated second grayscale data to the liquid crystal display panel, photographing the screen of the liquid crystal display panel by the camera, and obtaining a third grayscale compensation data of the liquid crystal display panel under the second grayscale value according to the brightness difference of the screen;
   wherein the predetermined grayscale compensation data scaling algorithm is:

$$b = \frac{N}{M}a,$$

wherein b is the second grayscale compensation data, a is the first grayscale compensation data, N is the second grayscale value, and M is the first grayscale value.

2. The method for detecting grayscale compensation data of a liquid crystal display panel as claimed in claim 1, further comprising:
   a step S6, comprising pairing and assembling the liquid crystal display panel with a production backlight module to provide light for the liquid crystal display panel through the production backlight module; and
   a step S7, comprising performing brightness compensation on the second grayscale value through the third grayscale compensation data when the liquid crystal display panel displays the second grayscale value.

3. The method for detecting grayscale compensation data of a liquid crystal display panel as claimed in claim 2, wherein the step S7 specifically comprises:
   obtaining the third grayscale compensation data and the second grayscale data;

compensating the second grayscale data with the third grayscale compensation data to obtain a target grayscale data; and driving the liquid crystal display panel through the target grayscale data to display the screen.

4. The method for detecting grayscale compensation data of a liquid crystal display panel as claimed in claim 2, wherein the step S5 further comprises: storing the third grayscale compensation data in a flash memory chip.

5. The method for detecting grayscale compensation data of a liquid crystal display panel as claimed in claim 4, wherein the flash memory chip is electrically connected to a compensation chip, wherein the compensation chip obtains the third grayscale compensation data from the flash memory chip and receives the second grayscale data to compensate the second grayscale data with the third grayscale compensation data so that a target grayscale data is obtained, and the target grayscale data is output to a timing controller.

6. The method for detecting grayscale compensation data of a liquid crystal display panel as claimed in claim 1, wherein the first grayscale value is 255.

7. The method for detecting grayscale compensation data of a liquid crystal display panel as claimed in claim 1, wherein a brightness ratio of a darkest part to a brightest part of a production backlight module is greater than 95%.

8. The method for detecting grayscale compensation data of a liquid crystal display panel as claimed in claim 1, wherein a way for obtaining the third grayscale compensation data in the step S5 specifically comprises:

according to the screen photographed by the camera, obtaining a brightness of each of pixels in the screen;

calculating the brightness difference between each of the pixels in the screen and a pixel at a center of the screen; and according to a gamma curve, calculating a grayscale data required for compensating the brightness difference to obtain the third grayscale compensation data.

9. The method for detecting grayscale compensation data of a liquid crystal display panel as claimed in claim 1, wherein the camera is a Charge-coupled Device (CCD) camera.

10. A method for detecting grayscale compensation data of a liquid crystal display panel, comprising:

a step S1, comprising pairing and assembling the liquid crystal display panel and a test backlight module to provide light for the liquid crystal display panel through the test backlight module;

a step S2, comprising inputting a first grayscale data corresponding to a first grayscale value to the liquid crystal display panel so that the liquid crystal display panel is in a brightest state, photographing a screen of the liquid crystal display panel by a camera, and calculating a first grayscale compensation data according to a brightness difference of the screen;

a step S3, comprising determining a second grayscale value to be photographed, and calculating a second grayscale compensation data corresponding to the second grayscale value to be photographed according to the second grayscale value to be photographed, a predetermined grayscale compensation data scaling algorithm, and the first grayscale compensation data;

a step S4, comprising compensating a second grayscale data corresponding to the second grayscale value with the second grayscale compensation data to obtain a compensated second grayscale data;

a step S5, comprising inputting the compensated second grayscale data to the liquid crystal display panel, photographing the screen of the liquid crystal display panel by the camera, and obtaining a third grayscale compensation data of the liquid crystal display panel under the second grayscale value according to the brightness difference of the screen;

a step S6, comprising pairing and assembling the liquid crystal display panel with a production backlight module to provide light for the liquid crystal display panel through the production backlight module; and a step S7, comprising performing brightness compensation on the second grayscale value through the third grayscale compensation data when the liquid crystal display panel displays the second grayscale value, wherein the predetermined grayscale compensation data scaling algorithm is:

$$b = \frac{N}{M} a,$$

wherein b is the second grayscale compensation data, a is the first grayscale compensation data, N is the second grayscale value, and M is the first grayscale value, wherein the step S7 specifically comprises:

obtaining the third grayscale compensation data and the second grayscale data;

compensating the second grayscale data with the third grayscale compensation data to obtain a target grayscale data; and driving the liquid crystal display panel through the target grayscale data to display the screen, wherein the step S5 further comprises: storing the third grayscale compensation data in a flash memory chip, wherein the flash memory chip is electrically connected to a compensation chip, wherein the compensation chip obtains the third grayscale compensation data from the flash memory chip and receives the second grayscale data to compensate the second grayscale data with the third grayscale compensation data so that the target grayscale data is obtained, and the target grayscale data is output to a timing controller.

11. The method for detecting grayscale compensation data of a liquid crystal display panel as claimed in claim 10, wherein the first grayscale value is 255.

12. The method for detecting grayscale compensation data of a liquid crystal display panel as claimed in claim 10, wherein a brightness ratio of a darkest part to a brightest part of the production backlight module is greater than 95%.

13. The method for detecting grayscale compensation data of a liquid crystal display panel as claimed in claim 10, wherein a way for obtaining the third grayscale compensation data in the step S5 specifically comprises:

according to the screen photographed by the camera, obtaining a brightness of each of pixels in the screen;

calculating the brightness difference between each of the pixels in the screen and a pixel at a center of the screen; and according to a gamma curve, calculating a grayscale data required for compensating the brightness difference to obtain the third grayscale compensation data.

14. The method for detecting grayscale compensation data of a liquid crystal display panel as claimed in claim 10, wherein the camera is a CCD camera.

* * * * *